Figure 1:
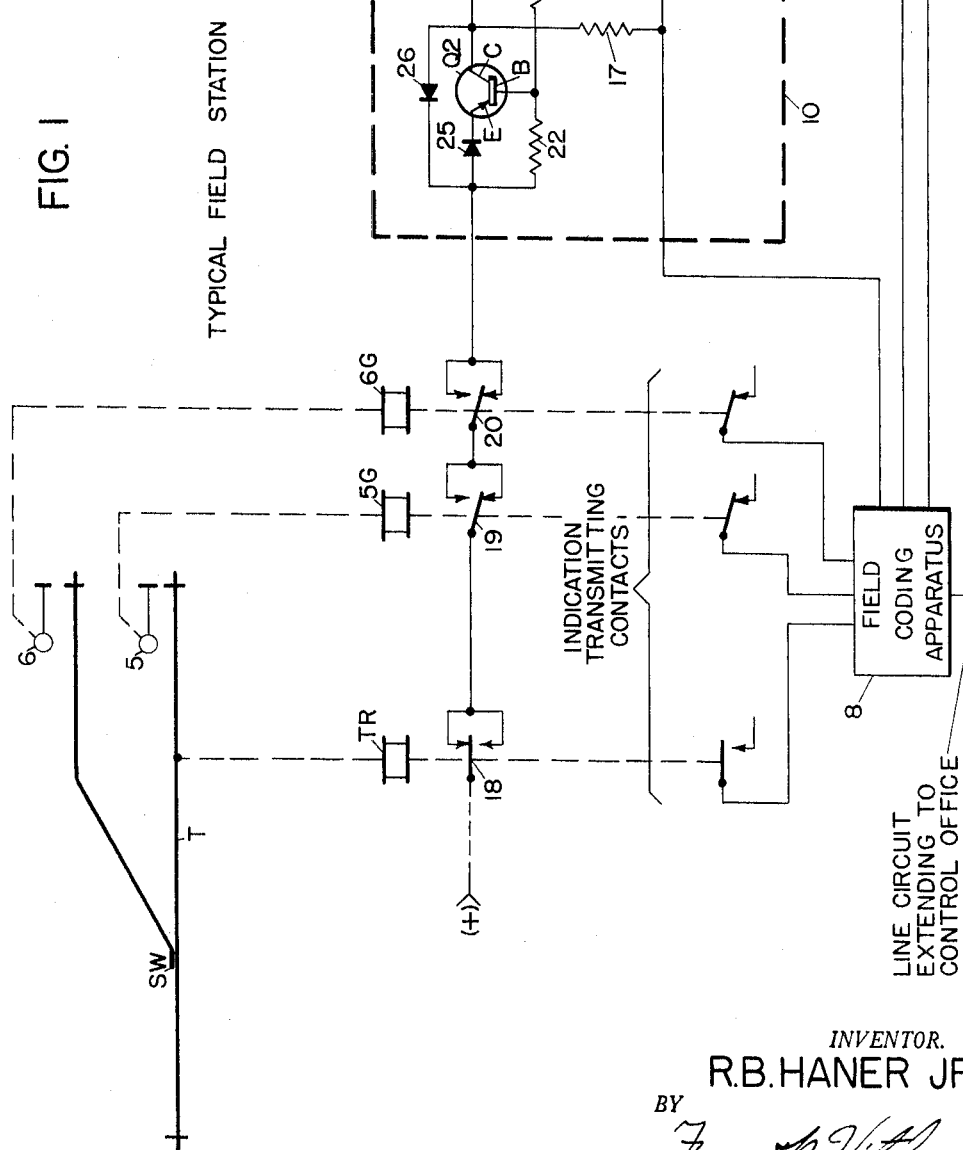

May 17, 1966  R. B. HANER, JR  3,251,992
STORAGE CIRCUIT
Filed Dec. 3, 1962  2 Sheets-Sheet 1

INVENTOR.
R.B. HANER JR.
BY
Forest B. Hitchcock
HIS ATTORNEY

United States Patent Office 3,251,992
Patented May 17, 1966

3,251,992
STORAGE CIRCUIT
Robert B. Haner, Jr., Scottsville, N.Y., assignor to
General Signal Corporation
Filed Dec. 3, 1962, Ser. No. 241,787
5 Claims. (Cl. 246—220)

This invention relates to a storage circut, and, more particularly, to such a circuit responsive to a momentarily applied input pulse for continuously supplying an output signal until a reset circuit becomes momentarily effective.

For certain purposes, it is frequently necessary to supply an output signal in response to a momentarily applied input signal continuously until a resetting circuit becomes momentarily effective. Such is the case in various types of code communication system such as a typical centralized traffic control system, a pipeline supervisory control system, etc. wherein code transmitting apparatus is employed at each of a plurality of field stations for transmitting to the control office indications of the position or condition of various controlling devices at the corresponding field station such, for example, as the position of a power operated track switch. In order that an operator may know the condition or position of the controlling devices at the plurality of field stations, visual indications are provided at the control office which are conditioned by codes transmitted from the respective stations to indicate the respective positions and conditions of the controlling devices.

It is the common practice in the types of code communication systems suggested above to employ suitable automatic field start means to initiate the coding apparatus at a field station into operation whenever any change in the position or condition of a controlling device occurs. To detect the change, a normally energized neutral relay commonly called a "change" relay is deenergized and dropped away, such dropping away then initiating the transmission of a new indication. A magnetic stick type relay is usually employed at the control office and controlled by the received indications representing a change in the position or condition of a controlling device which is operated and stuck in one of its two positions for providing a control to cause a visual indication to be given for apprising an operator of the existing position or condition of the controlling device.

More specifically, it has been the common practice to provide a stick circuit for the "change" relay which includes contacts of relays indicating the position or condition of the plurality of controlling devices for each field station. In order for the "change" relay to initiate the transmission of a new indication for a controlling device, the "change" relay must be dropped away during the crossover time of the indication relay for that controlling device. Inasmuch as the crossover time of any one of the indication relays commonly employed is in the order of eight milliseconds, it has been required to specially construct the "change" relay so that it has a quick drop away characteristic. One attempt to overcome the limitations of using a neutral type "change" relay was to employ a magnetic stick relay in lieu thereof, but this involved more circuitry which increased the overall expense.

It has additionally been common practice to employ magnetic stick relays at the control office for storing received indications from a field station so as to provide a continuous indication of the position or condition of the corresponding controlling device. The magnetic stick type relay is specially constructed to include permanent magnets so that the relay is held in an energized condition by such permanent magnet upon removal of controlling energy.

Generally speaking, and without attempting to define the exact nature and scope of the present invention, it is generally proposed to provide a storage circuit employable in each of the two instances mentioned above which overcomes the enumerated limitations. More particularly, in one instance, the storage circuit herein is employed to stick the "change" relay until such time as a change in position or condition of a controlling device momentarily effects a resetting circuit to cause the dropping away of the "change" relay in an amount of time less than is required for such event to take place. In a second instance, the storage circuit disclosed herein is employed in lieu of the magnetic stick relay at the control office for storing a received indication of the existing condition or position of a particular controlling device.

The novel storage circuit disclosed herein is comprised of two transistors which are rendered concurrently conductive in response to an input pulse momentarily applied and thereafter held conductive by means of a biasing circuit until such time as a reset circuit becomes momentarily effective. In this connection, either transistor may be controlled by a separate reset circuit momentarily effective to cause both transistors to assume the opposite state of conduction.

Thus, one object of this invention is to provide a storage circuit which is employed to overcome the above mentioned limitations.

Another object of this invention is to provide a storage circuit for dropping away an energized neutral field start relay when responsive to the momentary opening of an indication control circuit caused by a change in the position or condition of one or more controlling devices.

Another object of this invention is to provide a field start indication circuit employing a neutral field start relay which is capable of dropping away the relay by the momentary absence through the indication circuit of control energy as measured by the crossover time of an indication relay.

Another object of this invention is to provide a storage circuit for picking up a neutral relay in response to an input pulse momentarily applied which is stuck thereafter until a reset circuit becomes momentarily effective.

Another object of this invention is to provide a storage circuit operative to one condition by an input pulse of short duration momentarily applied for providing a continuous output signal until such time as a short duration pulse of opposite energy is momentarily applied thereto.

Other objects, purposes and characteristic features of the present invention will be in part obvious from the accompanying drawings, and in part pointed out as the description of the invention progresses.

Figure 2:
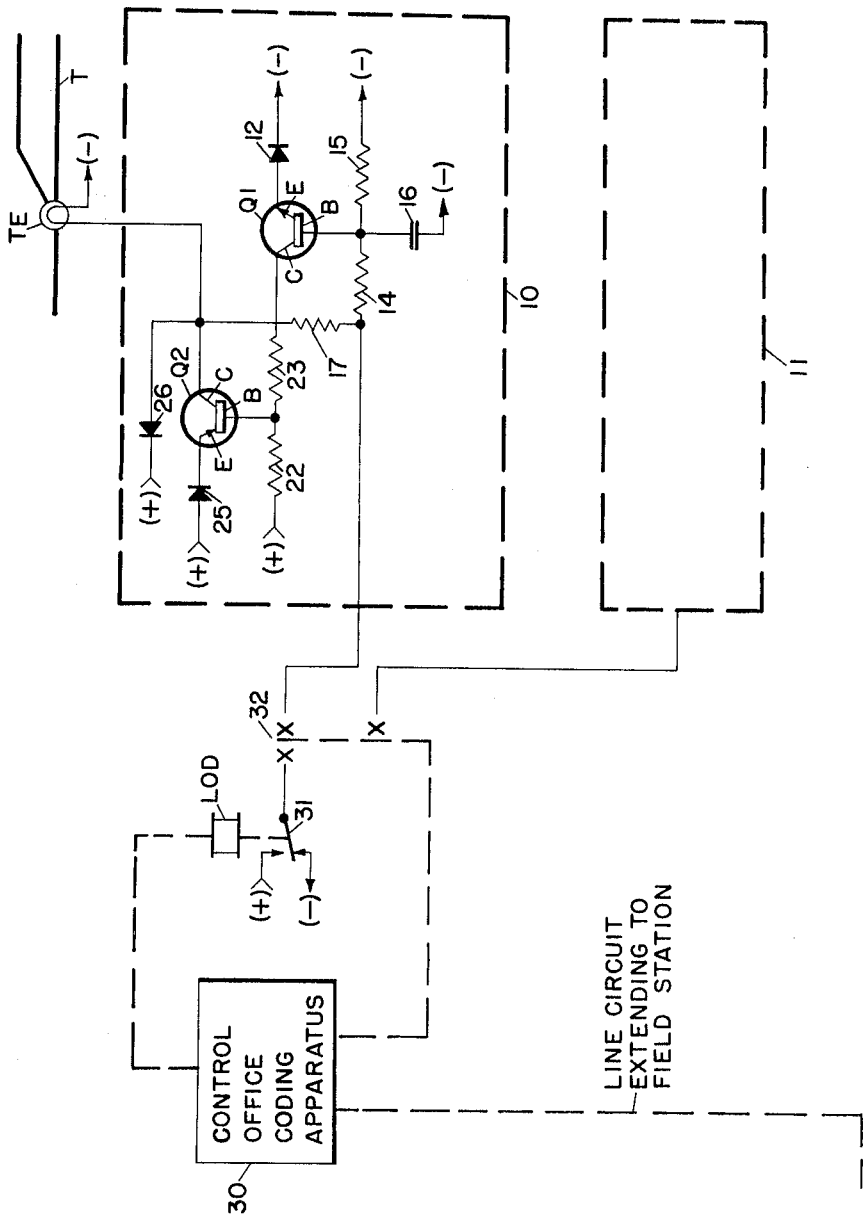

In describing the invention in detail, reference will be made to the accompanying drawings, in which like reference characters designate corresponding parts throughout the several views, and in which:

FIG. 1 shows diagrammatically one form of the invention applied to the transmission of indications for the position of a track occupancy indicator and signal indications in connection with a typical railroad passing siding; and, FIG. 2 shows diagrammatically the form of the invention applied to the storage of indications for track occupancy as visually indicated on a track layout.

For the purpose of simplifying the illustrations and facilitating in the explanation, the various parts and circuits constituting the embodiment of the invention have been shown diagrammatically and certain conventional illustrations have been employed, the drawings having been made more with the purpose of making it easy to understand the principles and mode of operation than with the idea of illustrating the specific construction and arrangement of parts that would be employed in practice. Thus, the various relays and their contacts are illustrated in the conventional manner, and symbols (+) and (−) are used to indicate connections to the terminals of batteries or other sources of electric current, instead of showing all of the wiring connections to these terminals.

The present invention is applicable to any type of code communication system having the characteristics described above, but particularly those systems suitable for use as centralized traffic control systems. In the interest of simplicity, only one particular embodiment of the invention herein has been illustrated in connection with a typical code communication system of the type shown and described in the Patent No. 2,399,734, granted to W. D. Hailes et al. on May 7, 1946 to which reference is made for a more detailed description thereof.

In the automatic field start control circuits as described in the above mentioned patent, the desired field start occurs when the normally energized neutral "change" relay is opened by a momentary interruption caused by a change in the position of an indication relay. It is the change of position of the contacts of that indication relay which opens the stick circuit for the "change" relay thereby causing the relay to drop away. The indication thus given by the dropped away condition of the "change" relay is transmitted to the control office where a magnetic stick relay is controlled for storing such indication and causing an indication to be given to the operator of the condition of the controlled device.

Referring now to FIG. 1, the invention hereof is applied to a typical track layout comprising a switch SW assumed to be located at the end of a passing siding of a single track railroad. The signals 5 and 6 by displaying a drop or proceed indication are assumed to govern traffic going from right to left. The usual power operated switch machine (not shown) as well as the other signals (not shown) are assumed to be present.

In the particular arrangement shown, it is assumed that the indications of the "clear" or "stop" condition of the respective signals 5 and 6 and the occupancy of the track section T will be transmitted to a control office over a conventional line circuit. The automatic field start for the signals indications and the nature of the indication to be transmitted are determined by the relays 5G and 6G, while the automatic field start for track occupancy is determined by the relay TR.

The field station coding apparatus is shown schematically as block 8 and is conditioned for operation by the dropped away condition of the neutral change relay CH as governed by contact 9 thereof. The coding apparatus 8 is operated in the usual manner, characteristic of systems of this type, to transmit at the appropriate time during the operating cycle indications of the then existing condition of the signal indication relays 5G and 6G and the track occupancy relay TR in that contacts of these relays govern the energization of indication control circuits shown diagrammatically which determine the character of the indication code elements.

The storage circuit 10 of this invention includes an NPN type transistor Q1 and a PNP type transistor Q2 along with associated resistors and diodes which are used for biasing purposes. Each of the transistors Q1 and Q2 includes three terminals, these being an emitter E, a base B, and a collector C.

The emitter E of transistor Q1 is connected to (−) through a diode 12, while its base B is connected to a biasing circuit including resistors 14 and 15, resistor 14 being connected to apparatus 8 and to collector C of transistor Q2 through a resistor 17 while resistor 15 is connected to (−). Also, base B of transistor Q1 is connected through capacitor 16 to (−). Collector C of transistor Q1 is connected to (+) through the contacts 18, 19 and 20 of relays TR, 5G and 6G respectively and through resistors 22 and 23.

The collector C of transistor Q2 is connected to (−) through the winding of relay CH, while base B thereof is connected to the biasing circuit including resistors 22 and 23. Emitter E is connected to (+) through the contacts 18, 19 and 20 of relays TR, 5G and 6G respectively and through a diode 25. A diode 26 is connected between emitter E and collector C of transistor Q2.

In operation, when a positive (+) energy pulse is momentarily supplied from field coding apparatus 8 to base B of transistor Q1 through resistor 14, transistor Q1 is rendered conductive in that base B thereof is made positive (+) with respect to its collector C. The conduction path then extends from (+), through front contact 18 of relay TR, through back contact 19 of relay 5G, through back contact 20 of relay 6G, through diode 25, through transistor Q2 from emitter E to base B through resistor 23, through transistor Q1 from collector C to emitter E through base B thereof, through diode 12, to (−). Thus, transistor Q2 is rendered conductive with the current flow path extending from (+), through front contact 18 of relay TR, through back contact 19 of relay 5G, through back contact 20 of relay 6G, through diode 25, through transistor Q2 from emitter E to collector C through base B thereof, through the winding of relay CH, to (−). Thus, relay CH is energized as is shown in FIG. 1 to cause its contact 9 to be open.

Upon removal of the positive (+) energy pulse from the field coding apparatus 8, transistor Q1 remains conductive in that the positive (+) energy appearing at collector C of transistor Q2 is connected through resistors 14 and 17 to base B of transistor Q1. As long as the conduction path is maintained through the indication contacts 18, 19 and 20 of relays TR, 5G and 6G respectively, transistors Q1 and Q2 remain conductive to cause relay CH to be picked up. However, a change in position initiated by at least one of the indication relays and its contact momentarily interrupts the positive (+) energy to the emitter E circuit of transistor Q2 and the collector C circuit of transistor Q1. More specifically, assuming the track T became occupied, relay TR would be dropped away in the usual way. As soon as contact 18 initiates its crossover travel, the positive (+) energy as supplied is momentarily interrupted from transistors Q1 and Q2. Transistor Q2 stops conducting substantially instantaneously causing relay CH to drop away. Also, transistor Q1 stops conducting because of the removal of (+) energy from its collector C. Contact 9 of relay CH then closes to cause the field coding apparatus 8 to send an indication change for track relay TR to the control office.

In the operation of circuit 10, diodes 12 and 25 in the emitter E circuits of transistors Q1 and Q2 respectively are provided as bias diodes to offset the tendency for self conduction due to small base-collector leakage current present when the transistor is hot. Capacitor 16 in the base circuit of transistor Q1 is provided to prevent unwanted operation initiated by noise spikes in the input circuit. Diode 26 connected across the emitter E and collector C circuits of transistor Q2 is provided for protecting transistor Q2 from inductive transients occurring during the operation of relay CH. Resistor 22 is connected between the emitter E and base B terminals of transistor Q2 prevents conduction thereof while transistor Q1 is not conducting.

Referring now to FIG. 2, the storage circuit 10 is diagrammatically illustrated with control office apparatus for controlling a lamp TE to indicate the condition of the track occupancy as determined by the dropped away condition of track relay TR. During a non-occupancy condition as indicated by the energization of relay TR at the field station, lamp TE is deenergized.

More particularly, transistors Q1 and Q2 are now assumed to be non-conductive in that a resetting circuit has been effective as governed by the control of coding apparatus 30. In this operation, relay LOD is dropped away so as to supply through its back contact 31 a negative (−) energy through contacts (not shown) indicated by XX and designated 32 which is applied to base B of transistor Q1 through resistor 14. This causes transistor Q1 to turn off thus disconnecting the biasing circuit for transistor Q2 which includes transistor Q1 and resistors 22 and 23. Positive (+) enegry is placed on base B of transistor Q2 through resistor 22 to cause it to stop conducting thereby removing the positive (+) energy source for lamp TE and causing it to be deenergized.

When the control office apparatus 30 receives code energy indicating a change in position of track relay TR as described above, relay LOD is energized to cause positive (+) energy to be supplied momentarily through the contacts (not shown) indicated by XX and designated 32 to base B of transistor Q1 through resistor 14. Transistor Q1 then turns on with a conduction path being completed which includes resistor 23, diode 25 and the emitter E and base B terminals of transistor Q2. A conduction path for transistor Q2 extends from (+), through diode 25, through transistor Q2 from its emitter E to collector C through base B thereof, through the filament of lamp TE, to (−). Lamp TE is then energized to indicate occupancy of the track T.

As the system operates according to the above mentioned Hailes et al. patent, at least one of the contacts (not shown) indicated by XX and designated 32 is opened to remove the positive (+) energy through front contact 31 of relay LOD. However, positive (+) energy is supplied to base B of transistor Q1 through the conduction of transistor Q2 and resistors 14 and 17 to cause both transistors Q1 and Q2 to remain conductive. When the train leaves the track T, relay TR is again energized because a code is transmitted to the control office causing relay LOD thereat to drop away and subsequently the transistors Q1 and Q2 to be rendered nonconductive, as described, which deenergized the lamp TE.

Similar operation occurs with regard to other indication storage circuits such as shown at 11, which are individually controlled the same as the storage circuit 10 but at different times as selected by the contacts 32 of the coding apparatus.

Having described a storage circuit, as one specific embodiment of the present invention, it is desired to be understood that this form is selected to facilitate in the disclosure of the invention rather than to limit the number of forms which it may assume; and, it is to be further understood that various modifications, adaptations and alterations may be applied to the specific form shown to meet the requirements of practice, without in any manner departing from the spirit or scope of the present invention.

What I claim is:

1. In a centralized traffic control system for railroads, a plurality of traffic controlling devices at a particular location, a movable contact for each of said plurality of traffic controlling devices for indicating by contact movement a change in condition of its associated traffic controlling device, a storage circuit means comprising first and second transistors each having base, emitter,, and collector terminals, said first transistor having conductive paths including its terminals and selected terminals of said second transistor and said movable contacts of said traffic controlling devices, circuit means for rendering said first transistor conductive in response to a momentary reset signal received from a central office, said second transistor being controlled to conductive by said first transistor being rendered conductive and having its conducting paths incuding its emitter terminal connected to control energy through said movable contacts of said traffic controlling devices, a neutral change relay connected in one of said conducting paths of said second transistor and picked up only when such second transistor is conductive, the first transistor having a conductive path including its terminals and biasing resistance and the movable contacts of said traffic controlling device, a bias circuit means for said first transistor for maintaining it conductive so long as said second transistor is conductive, whereby the movement of one or more of said movable contacts of said traffic controlling devices momentarily interrupts the conductive paths of said first and second transistor for causing non-conduction thereof until said first transistor is again rendered conductive by a momentary reset signal.

2. The combination according to claim 1 wherein said biasing circuit means connects the collector terminal of said second transistor to the base terminal of said first transistor, said biasing circuit means being effective to feed a portion of the control energy applied to the emitter of said second transistor to the base terminal of said first transistor so that said first transistor remains conductive after said momentarily applied reset signal is removed, whereby said storage circuit means remains conditioned until at least one of said movable contacts shifts from one contact position to the other contact position.

3. In a combination according to claim 1 wherein a normally at rest code communication system provides means for transmitting indication codes to a central office, and in which the deenergization of said change relay initiates said code communication system for transmitting indications of the conditions of said plurality of traffic controlling devices.

4. In a centralized traffic control system for railroads, a plurality of traffic controlling devices at a particular location, a plurality of indication means at a control office each corresponding to one of said plurality of traffic controlling devices and operative to a plurality of conditions each for indicating one condition of the corresponding traffic controlling device, a storage circuit means for each of said indication means each when selected responsive to indications momentarily received from the particular location relative to the condition of the associated traffic controlling device, each said storage circuit means comprising two transistors each having base, emitter and collector terminals, a first transistor of said two transistors having a conductive path including its terminals and biasing resistors and being rendered conductive in response to the momentary application of a positive signal to its base terminal and being rendered non-conductive in response to the momentary application of a negative signal to its base terminal, said second of said two transistors having its base terminal connected to at least one bias resistor connected in said conductive path and its emitter being connected to a source of energy, and such second transistor being responsive to the condition of conductivity of said first transistor to assume a similar condition, circuit means for connecting each said indication means to the collector of its corresponding one of said second transistors, whereby a conductive path through the terminals of any second transistor permits said energy to supply activating energy to a corresponding said indication means.

5. The combination according to claim 4 wherein said first transistor is an N–P–N type transistor and said second transistor is a P–N–P type transistor.

References Cited by the Examiner

UNITED STATES PATENTS 3,130,326    4/1964    Habisohn _____ 307—88.5
3,155,963   11/1964    Boensel _____ 307—88.5

OTHER REFERENCES

IBM Technical Disclosure Bulletin, vol. 4, No. 3, August 1961, page 83.

EUGENE G. BOTZ, *Primary Examiner.*